United States Patent
Gregorio et al.

(10) Patent No.: US 7,233,315 B2
(45) Date of Patent: Jun. 19, 2007

(54) HAPTIC FEEDBACK DEVICES AND METHODS FOR SIMULATING AN ORIFICE

(75) Inventors: Pedro Gregorio, Verdun (CA); David Bailey, Menlo Park, CA (US); Robert Cohen, Kensington, MD (US); Rich Cunningham, Washington, DC (US); Neil Olien, Montreal (CA)

(73) Assignee: Immersion Corporation, San Jose, CA (US)

( * ) Notice: Subject to any disclaimer, the term of this patent is extended or adjusted under 35 U.S.C. 154(b) by 87 days.

(21) Appl. No.: 10/898,929

(22) Filed: Jul. 27, 2004

(65) Prior Publication Data

US 2004/0263474 A1 Dec. 30, 2004

Related U.S. Application Data

(62) Division of application No. 10/299,024, filed on Nov. 19, 2002, now Pat. No. 6,965,370.

(51) Int. Cl.
G09G 5/00 (2006.01)
(52) U.S. Cl. ...................... 345/156; 345/164
(58) Field of Classification Search ........... 345/161, 345/184, 156, 157, 158, 164; 434/262, 263, 434/267, 270, 271, 272; 600/101, 921; 604/328; 606/205; 715/701, 702, 710, 800, 831
See application file for complete search history.

(56) References Cited

U.S. PATENT DOCUMENTS

| | | | |
|---|---|---|---|
| 2,972,140 A | 2/1961 | Hirsch | |
| 3,157,853 A | 11/1964 | Hirsch | |
| 3,220,121 A | 11/1965 | Cutler | |
| 3,497,668 A | 2/1970 | Hirsch | |
| 3,517,446 A | 6/1970 | Corlyon et al. | |
| 3,623,064 A | 11/1971 | Kagan | |

(Continued)

FOREIGN PATENT DOCUMENTS

EP 0 349 086 A1 1/1990

(Continued)

OTHER PUBLICATIONS

Baigrie. "Electric Control Loading—A Low Cost, High Performance Alternative," *Proceedings of Interservice/Industry Training Systems Conference*, pp. 247-254, Nov. 6-8, 1990.

(Continued)

*Primary Examiner*—Nitin Patel
(74) *Attorney, Agent, or Firm*—Thelen Reid Brown Raysman & Steiner; David B. Ritchie

(57) ABSTRACT

An apparatus comprises an input device and an actuator. The input device has an interface portion. The interface portion defines a selectively adjustable orifice having a range of sizes. The interface portion defines a plane and a longitudinal axis. An actuator is coupled to the interface portion of the input device. The actuator is configured to apply a haptic feedback force inwardly with respect to the longitudinal axis within the plane to at least three locations of the interface portion when a change in a size of an object disposed within the interface portion is sufficient to adjust the size of the orifice.

18 Claims, 16 Drawing Sheets

U.S. PATENT DOCUMENTS

| | | | |
|---|---|---|---|
| 3,902,687 A | 9/1975 | Hightower | |
| 3,903,614 A | 9/1975 | Diamond et al. | |
| 3,911,416 A | 10/1975 | Feder | |
| 4,127,752 A | 11/1978 | Lowthorp | |
| 4,160,508 A | 7/1979 | Frosch et al. | |
| 4,236,325 A | 12/1980 | Hall et al. | |
| 4,262,549 A | 4/1981 | Schwellenbach | |
| 4,333,070 A | 6/1982 | Barnes | |
| 4,416,029 A * | 11/1983 | Kaster | 623/2.24 |
| 4,464,117 A | 8/1984 | Foerst | |
| 4,484,191 A | 11/1984 | Vavra | |
| 4,496,356 A * | 1/1985 | Lognion | 604/328 |
| 4,513,235 A | 4/1985 | Acklam et al. | |
| 4,581,491 A | 4/1986 | Boothroyd | |
| 4,587,954 A * | 5/1986 | Haber | 600/31 |
| 4,599,070 A | 7/1986 | Hladky et al. | |
| 4,708,656 A | 11/1987 | de Vries et al. | |
| 4,713,007 A | 12/1987 | Alban | |
| 4,794,392 A | 12/1988 | Selinko | |
| 4,885,565 A | 12/1989 | Embach | |
| 4,891,764 A | 1/1990 | McIntosh | |
| 4,930,770 A | 6/1990 | Baker | |
| 4,934,694 A | 6/1990 | McIntosh | |
| 5,019,761 A | 5/1991 | Kraft | |
| 5,022,384 A | 6/1991 | Freels | |
| 5,022,407 A | 6/1991 | Horch et al. | |
| 5,035,242 A | 7/1991 | Franklin et al. | |
| 5,038,089 A | 8/1991 | Szakaly | |
| 5,078,152 A | 1/1992 | Bond et al. | |
| 5,165,897 A | 11/1992 | Johnson | |
| 5,175,459 A | 12/1992 | Danial et al. | |
| 5,186,695 A | 2/1993 | Mangseth et al. | |
| 5,212,473 A | 5/1993 | Louis | |
| 5,240,417 A | 8/1993 | Smithson et al. | |
| 5,271,290 A | 12/1993 | Fischer | |
| 5,275,174 A | 1/1994 | Cook | |
| 5,283,970 A | 2/1994 | Aigner | |
| 5,299,810 A | 4/1994 | Pierce et al. | |
| 5,309,140 A | 5/1994 | Everett, Jr. et al. | |
| 5,334,027 A | 8/1994 | Wherlock | |
| 5,436,622 A | 7/1995 | Gutman et al. | |
| 5,437,607 A | 8/1995 | Taylor | |
| 5,466,213 A | 11/1995 | Hogan et al. | |
| 5,547,382 A | 8/1996 | Yamasaki et al. | |
| 5,575,761 A | 11/1996 | Hajianpour | |
| 5,690,582 A | 11/1997 | Ulrich et al. | |
| 5,704,791 A * | 1/1998 | Gillio | 434/262 |
| 5,766,016 A | 6/1998 | Sinclair et al. | |
| 5,785,630 A | 7/1998 | Bobick et al. | |
| 5,800,177 A | 9/1998 | Gillio | |
| 5,800,178 A | 9/1998 | Gillio | |
| 5,882,206 A | 3/1999 | Gillio | |
| 6,111,577 A | 8/2000 | Zilles et al. | |
| 6,160,489 A | 12/2000 | Perry et al. | |
| 6,422,941 B1 | 7/2002 | Thorner et al. | |
| 2004/0059374 A1 * | 3/2004 | Knodel et al. | 606/205 |

FOREIGN PATENT DOCUMENTS

| | | |
|---|---|---|
| GB | 2 252 656 A | 8/1992 |
| JP | H2-185278 | 7/1990 |
| JP | H4-8381 | 1/1992 |
| JP | H5-192449 | 8/1993 |
| JP | H7-24147 | 1/1995 |
| WO | WO 99/38141 | 7/1999 |
| WO | WO 01/78039 | 10/2001 |
| WO | WO 01/88881 | 11/2001 |
| WO | WO 01/88882 | 11/2001 |

OTHER PUBLICATIONS

Iwata, "Pen-based Haptic Virtual Environment," 0-7803-1363-1/93 IEEE, pp. 287-292, 1993.

Russo, "The Design and Implementation of Three Degree of Freedom Force Output Joystick," *MIT Libraries Archives* pp. 1-131, May 1990, archived Aug. 14, 1990.

Brooks et al., "Hand Controllers for Teleoperation—A State-of-the-Art Technology Survey and Evaluation," *JPL Publication 85-11*, NASA-CR-175890; N85-28559, pp. 1-84, Mar. 1, 1985.

Jones et al. "A perceptual analysis of stiffness," ISSN 0014-4819 Springer International (Springer-Verlag); *Experimental Brain Research*, vol. 79, No. 1, pp. 150-156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25-44, May 2, 1993.

Snow et al., Model-X Force-Reflecting-Hand-Controller, NT Control No. NPO-17851; JPL Case No. 7348, pp. 1-4 with 45 pages of attachments, Jun. 15, 1989.

Ouh-Young, "Force Display in Molecular Docking," Doctoral Dissertation, University of North Carolina at Chapel Hill, UMI Order No. 9034744, pp. 1-369, 1990.

Tadros, "Control System Design for a Three Degree of Freedom Virtual Environment Simulator Using Motor/Brake Pair Actuators," *MIT Archive*, pp. 1-88, Feb. 1990, archived Aug. 13, 1990.

Caldwell et al., "Enhanced Tactile Feedback (Tele-Taction) Using a Multi-Functional Sensory System," 1050-4729/93, pp. 955-960, 1993.

Adelstein et al., "Design and Implementation of Force Reflecting Manipulandum for Manual Control research," DSC-vol. 42, *Advances in Robotics*, pp. 1-12, 1992.

Gotow et al., "Controlled Impedance Test Apparatus for Studying Human Interpretation of Kinesthetic Feedback," WA11-11:00, pp. 332-337.

Stanley et al., "Computer Simulation of Interacting Dynamic Mechanical Systems Using Distributed Memory Parallel Processors," DSC-vol. 42, *Advances in Robotics*, pp. 55-61, ASME 1992.

Russo, "Controlling Dissipative Magnetic Particle Brakes in Force Reflective Devices," DSC-vol. 42, *Advances in Robotocis*, pp. 63-70, ASME 1992.

Kontarinis et al., "Display of High-Frequency Tactile Information to Teleoperators," *Telemanipulator Technology and Space Telerobotics*, Won S. Kim, Editor, Proc. SPIE vol. 2057, pp. 40-50, Sep. 7-9, 1993.

Patrick et al., "Design and Testing of A Non-reacitve, Fingertip, Tactile Display for Interaction with Remote Environments," *Cooperative Intelligent Robotics in Space*, Rui J. deFigueiredo et al, Editor, Proc. SPIE vol. 1387, pp. 215-222, 1990.

"Cyberman Technical Specification," *Logitech Cyberman SWIFT Supplement to Logitech Mouse Technical Reference and Programming Guide*, Apr. 5, 1994.

"Technical Manual Overhaul Instructions With Parts Breakdown, Coaxial Control Shaker Part No. C-25502," Safe Flight Instrument Corporation, Revised Jul. 15, 1980 (23 pages).

"Component Maintenace Manual With Illustrated Parts List, Coaxial Control Shaker Part No. C-25502," Safe Flight Instrument Corporation, Revised Jan. 28, 2002 (3 pages).

Adelstein, "A Virtual Environment System For The Study of Human Arm Tremor," *Ph.D. Dissertation*, Dept. of Mechanical Engineering, MIT, Jun. 1989, archived Mar. 13, 1990.

Aukstakalnis et al., "Silicon Mirage: The Art and Science of Virtual Reality," ISBN 0-938151-82-7, pp. 129-180, 1992.

Bejczy et al., "A Laboratory Breadboard System For Dual-Arm Teleoperation," *SOAR '89 Workshop, JSC*, Houston, TX, Jul. 25-27, 1989.

Bejczy et al., "Generalization of Bilateral Force-Reflecting Control of Manipulators," *Proceedings Of Fourth CISM-IFToMM*, Sep. 8-12, 1981.

Bejczy et al., "Kinesthetic Coupling Between Operator and Remote Manipulator," *International Computer Technology Conference, The American Society of Mechanical Engineers*, San Francisco, CA, Aug. 12-15, 1980.

Bejczy, "Sensors, Controls, and Man-Machine Interface for Advanced Teleoperation," *Science*, vol. 208, No. 4450, pp. 1327-1335, 1980.

Bejczy, et al., "Universal Computer Control System (UCCS) For Space Telerobots," CH2413-3/87/0000/0318501.00 1987 IEEE, 1987.

Bliss, "Optical-to-Tactile Image Conversion for the Blind," *IEEE Transactions on Man-Machine Systems*, vol. MMS-11, No. 1, Mar. 1970.

Calder, "Design of A Force-Feedback Touch-Introducing Actuator For Teleoperator Robot Control," *Bachelor of Science Thesis*, May 1983, archived Jun. 23, 1983.

Eberhardt et al., "Inducing Dynamic Haptic Perception by The Hand: System Description and Some Results," DSC-vol. 55-1, *Dynamic Systems and Control*: vol. 1, ASME 1994.

Eberhardt et al., "OMAR—A Haptic display for speech perception by deaf and deaf-blind individuals," *IEEE Virtual Reality Annual International Symposium*, Seattle, WA, Sep. 18-22, 1993.

Gobel et al., "Tactile Feedback Applied to Computer Mice," *International Journal of Human-Computer Interaction*, vol. 7, No. 1, pp. 1-24, 1995.

Howe, "A Force-Reflecting Teleoperated Hand System for the Study of Tactile Sensing in Precision Manipulation," *Proceedings of the 1992 IEEE International Conference on Robotics and Automation*, Nice, France, May 1992.

IBM Technical Disclosure Bulletin, "Mouse Ball-Actuating Device With Force and Tactile Feedback," vol. 32, No. 9B, Feb. 1990.

Jacobsen et al., "High Performance, Dextrous Telerobotic Manipulator With Force Reflection," *Intervention/ROV '91 Conference & Exposition*, Hollywood, Florida, May 21-23, 1991.

Johnson, "Shape-Memory Alloy Tactile Feedback Actuator," *Armstrong Aerospace Medical Research Laboratory*, AMMRL-TR-90-039, Aug. 1990.

Kaczmarek et al., "Tactile Displays," *Virtual Environment Technologies*, Chap. 9, pp. 349-414.

Kontarinis et al., "Tactile Display of Vibratory Information in Teleoperation and Virtual Environments," PRESENCE, 4(4):387-402, Harvard Univ., 1995.

Lake, "Cyberman from Logitech," at http://www.ibiblio.org/GamesBytes/issue21/greviews/cyberman.html, 1994.

Marcus, "Touch Feedback in Surgery," *Proceedings of Virtual Reality and Medicine The Cutting Edge*, Sep. 8-11, 1994.

McAffee et al. "Teleoperator Subsystem/Telerobot Demonstrator: Force Reflection Hand Controller Equipment Manual," *JPL* 1988, JPL D-5172.

Minsky, "Computational Haptics: The Sandpaper System for Synthesizing Texture for a Force-Feedback Display," *Ph.D. Dissertation*, MIT, Jun. 1995, archived Jul. 6, 1995.

Noll, "Man-Machine Tactile," *SID Journal*, Jul./Aug. 1972 Issue.

Ouhyoung et al, "The Development of A Low-Cost Force Feedback Joystick and Its Use in the Virtual Reality Environment," Proceedings of the Third Pacific Conference on Computer Graphics and Applications, *Pacific Graphics '95*, Seoul, Korea, Aug. 21-24, 1995.

Ouhyoung et al., "A Low-Cost Force Feedback Joystick and Its Use in PC Video Games," *IEEE Transactions on Consumer Electronics*, vol. 41, No. 3, Aug. 1995.

Patrick, "Design, Construction, and Testing of a Fingertip Tactile Display for Interaction with Virtual and Remote Environments," *Master of Science Thesis*, MIT, Aug. 1990, archived Nov. 8, 1990.

Pimentel et al., "Virtual Reality: through the new looking glass," 2$^{nd}$ Edition; McGraw-Hill, ISBN 0-07-050167-X, pp. 41-202, 1994.

Rabinowitz et al., "Multidimensional tactile displays: Identification of vibratory intensity, frequency, and contractor area," *Journal of The Acoustical Society of America*, vol. 82, No. 4, Oct. 1987.

Rosenberg, "Virtual Fixtures: Perceptual Overlays Enhance Operator Performance in Telepresence Tasks," Ph.D. Dissertation, Stanford University, Jun. 1994.

Scannell, "Taking a Joystick Ride," Computer Currents, Boston Edition, vol. 9, No. 11, Nov. 1994.

Shimoga, "Finger Force and Touch Feedback Issues in Dexterous Telemanipulation," *Proceedings of the Fourth Annual Conference on Intelligent Robotic Systems for Space Exploration*, Rensselaer Polytechnic Institute, Sep. 30-Oct. 1, 1992.

Terry et al., "Tactile Feedback In A Computer Mouse," *Proceedings of Fourteenth Annual Northeast Bioengineering Conference, Universtiy of New Hampshire*, Mar. 10-11, 1988.

Wiker, "Teletouch Display Development: Phase 1 Report," *Technical Report 1230*, Naval Ocean Systems Center, San Diego, Jul. 1988.

Yamakita et al., "Tele-Virtual Reality of Dynamic Mechanical Model," *Proceedings of the 1992 IEEE/RSJ International Conference on Intelligent Robots and Systems*, Raleigh, NC, Jul. 7-10, 1992.

\* cited by examiner

HAPTIC FEEDBACK DEVICES AND METHODS FOR SIMULATING AN ORIFICE

CROSS-REFERENCE TO RELATED APPLICATIONS

This application is a divisional of U.S. application Ser. No. 10/299,024, filed Nov. 19, 2002 now U.S. Pat. No. 6,965,370, the entirety of which is incorporated herein by reference in its entirety.

BACKGROUND

The present invention relates generally to haptic feedback devices and more particularly to systems and methods for simulating an orifice.

Known virtual surgery systems allow the simulation of a surgical procedure in conjunction with image data of a patient. Such a surgical procedure typically involves the simulation of an orifice and the interaction of a surgical instrument or a device simulating a surgical instrument with that simulated orifice. In other words, simulated surgical instruments or certain actual surgical instruments a doctor would use in an actual procedure are typically inserted into and moved within a simulated orifice of known virtual surgery systems.

These known virtual surgery systems, however, are generally limited to devices having a uniform cross-section such as for example an endoscope or a similar tube-like structure. These limited devices are typically sufficient for providing a simulation involving a surgical instrument having a uniform cross-section or involving a device having a uniform cross-section that simulates a virtual surgical instrument.

Such devices having a uniform cross-section, however, provide tactile feedback that is insufficiently accurate. Alternatively, such devices having a uniform cross-section involve an undesired level of complexity and cost to provide accurate tactile feedback. Thus, improved systems and methods are needed.

SUMMARY OF THE INVENTION

An apparatus comprises an input device and an actuator. The input device has an interface portion. The interface portion defines a selectively adjustable orifice having a range of sizes. The interface portion defines a plane and a longitudinal axis. An actuator is coupled to the interface portion of the input device. The actuator is configured to apply a haptic feedback force inwardly with respect to the longitudinal axis within the plane to at least three locations of the interface portion when a change in a size of an object disposed within the interface portion is sufficient to adjust the size of the orifice.

DETAILED DESCRIPTION

Figure 1:
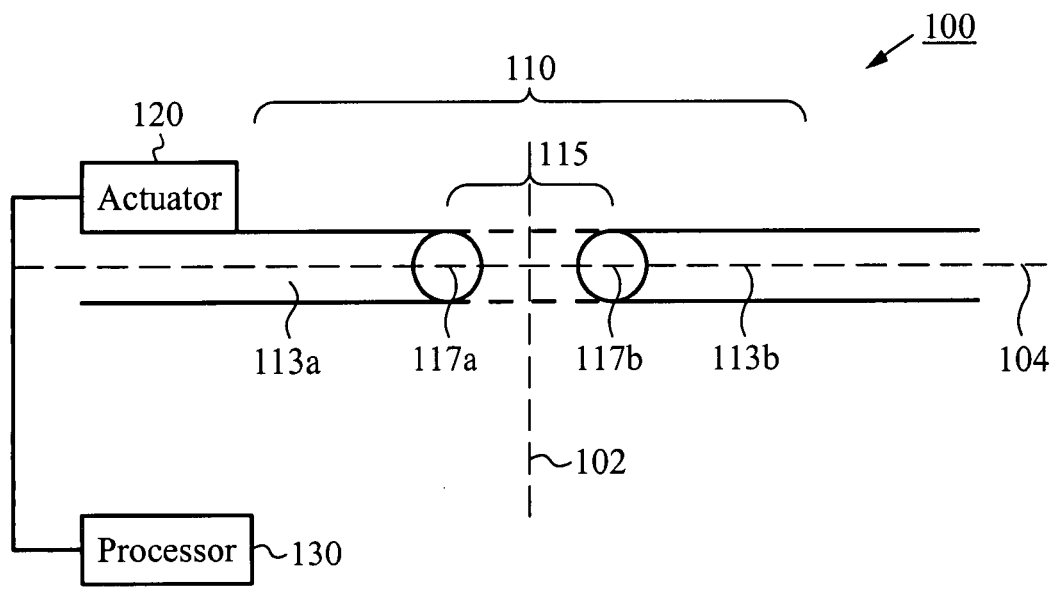
FIGS. 1 and 2 show a schematic of a haptic device that simulates an orifice, according to an embodiment of the invention.

Virtual surgery systems simulate the portion of the body upon which the surgical procedure relates. One recurring issue in virtual surgery systems is the insertion of medical instruments into tissues by, for example, as puncturing tissue or entering existing natural openings. Often, virtual surgery involves introducing into orifices progressively larger tools, for example, for large gauge needles, large gauge catheters, endocscopic instruments or gynecological instruments. New physicians undergo a substantial amount of learning relating to the feel of these interactions.

Simulating an orifice can present a particular challenge: an orifice of a body involves a complex set of characteristics and behaviors. For example, an orifice (a natural orifice or a created orifice such as a tissue tear) typically resists penetration and expansion of the orifice size. As an object (e.g., a medical instrument) is passed through an orifice, the object typically experiences some amount of surface friction in the direction of movement and a greater amount of radial resistance if the object has an increasing cross-sectional size. This radial resistance to expansion can be, for example, a function of time and orifice size. A subsequent contraction of the orifice can also be, for example, a function of time. Such contraction can be due to, for example, the removal of the object or the decrease in the object size as the object is moved through the orifice. Consequently, a device for simulating an orifice should replicate some or all of these orifice characteristics and behaviors as well.

Embodiments described herein replicate many of the characteristics and behaviors of a body orifice. For example, in one embodiment, a haptic device comprises an input device and an actuator. The input device has an interface portion. The interface portion defines a selectively adjustable orifice having a range of sizes. The interface portion defines a plane and a longitudinal axis. An actuator is coupled to the interface portion of the input device. The actuator is configured to apply a haptic feedback force inwardly with respect to the longitudinal axis within the plane to at least three locations of the interface portion when a change in a size of an object disposed within the interface portion is sufficient to adjust the size of the orifice.

This haptic feedback force can result in a user experiencing tactile feedback when the object being moved within the orifice has an increasing or decreasing size. In some embodiments, the user also experiences a nominal tactile feedback (e.g., due to surface friction) when the object portion has uniform size. Thus, when a change in the size of an object moved through the orifice is sufficient to adjust the size of the orifice, a haptic feedback force is produced thereby simulating the tactile feel of a biological orifice having its size changed by an inserted object. Similarly, when the size of the object being moved within the orifice is unchanged, the user experiences only nominal tactile feedback. In an alternative embodiment, rather than providing nominal tactile feedback when the object portion has uniform size, a greater amount of haptic feedback force can be provided. In such an embodiment, actuators can be configured to provide a haptic feedback force having a component in the inward direction combined with a component in longitudinal direction.

In some embodiments, a haptic feedback force in the inward direction can be applied not only when an object is inserted into the orifice of the input device, but also when in connection with the removal of the object. For example, where an object has a bulb like shape, the haptic feedback force can be applied to resist the removal of the object corresponding to the increased size of the object for the bulb-like portion. In such embodiments, actuators can be configured to provide a haptic feedback force having a component in the inward direction and/or a component in longitudinal direction to simulate resistance to the object removal.

The term "orifice" of a haptic device is used herein to mean any type of opening through which an object can be passed. Such an orifice can have one or more shapes and can simulate one or more shapes such as a circular opening, an oval opening or an opening having a non-circular or non-oval shape. The particular measure of the range of sizes for a given orifice will typically depend on the orifice's shape. For example, where the orifice of the input device has a circular shape, the corresponding range of sizes can be circular and the diameter of the orifice can be referred to for convenience. Alternatively, where the orifice of the input device has a non-circular shape, the corresponding range of sizes can be expressed in terms of the orifice perimeter, the orifice area, or any other appropriate term.

Figure 2:
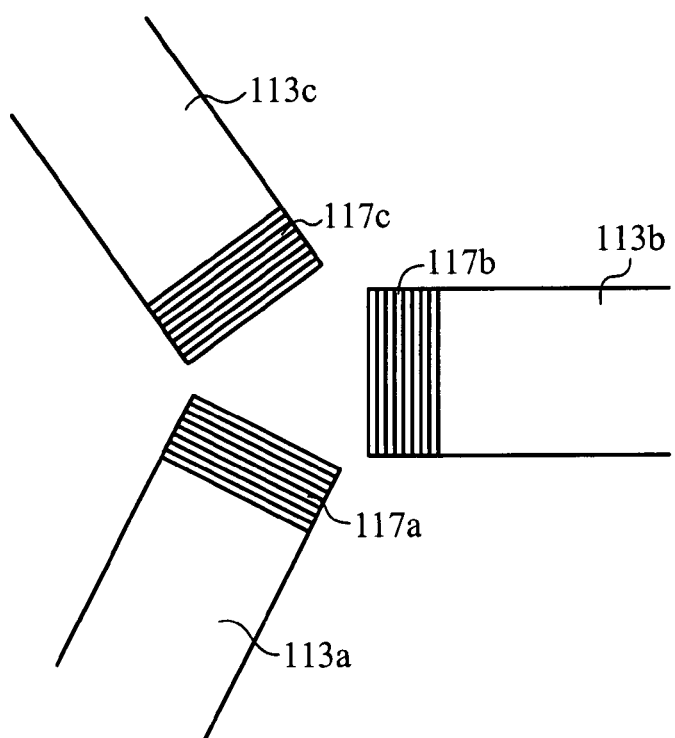

FIGS. 1 and 2 show a schematic of a haptic device that simulates an orifice, according to an embodiment of the invention. In particular, FIG. 1 includes a cross-sectional view of the input device of the haptic device; FIG. 2 shows a top view of the input device of the haptic device.

Haptic device 100 includes an input device 110, actuator 120, and processor 130. Input device 110 includes members 113a, 113b and 113c, and interface portion 117. A distal end of each member 113a, 113b and 113c includes interface portion 117a, 117b and 117c, respectively. Interface portion 117 defines orifice 115, which is selectively adjustable. Interface portion 117 also defines longitudinal axis 102 and plane 104. Although plane 104 is shown in FIG. 1 as a transverse plane with respect to longitudinal axis 102, in other embodiments, plane 104 can be a substantially transverse plane with respect to longitudinal axis 102 or a plane not transverse to longitudinal axis 102.

As shown in FIG. 1, actuator 120 is coupled to member 113a, thereby moving member 113a along a radial direction with respect to longitudinal axis 102. This can allow the selective adjustment of the size of the orifice 115. Actuator 120 can be for example, an elastic member, voice coil or a motor such as a direct current (DC) motor. In certain embodiments for example where the actuator is a motor, processor 130 can control the actuator. In other embodiments for example where the actuator is an elastic member, the processor need not be present.

Although FIGS. 1 and 2 show a single actuator 120 coupled to member 113a, other embodiments are possible where additional actuators are present. For example, each member 113a, 113b and 113c can be associated with its own actuator. In such an embodiment, the size of the orifice can be selectively adjusted through the coordinated activation of all three actuators.

Similarly, although only three members 113a, 113b and 113c are shown in FIGS. 1 and 2, the interface portion of the input device can have more than three members that collectively define the orifice. In such embodiments, an equal number of actuators can each be uniquely associated with a member of the interface portion. Alternatively, a fewer number of actuators (e.g., as few as one actuator) can be associated with a respective member of the interface portion of the input device.

Although actuator 120 is configured to move member 113a along a radial direction with respect to longitudinal axis 102, actuator 120 can be combined with other actuator (s) configured to provide haptic feedback along a longitudinal direction with respective to longitudinal axis 102. Such an embodiment can include at the interface portion, for example, a roller the rotation of which is controlled by an actuator. In other words, actuators can be configured to provide a haptic feedback force having a component in the inward direction combined with a component in longitudinal direction.

Figure 3:
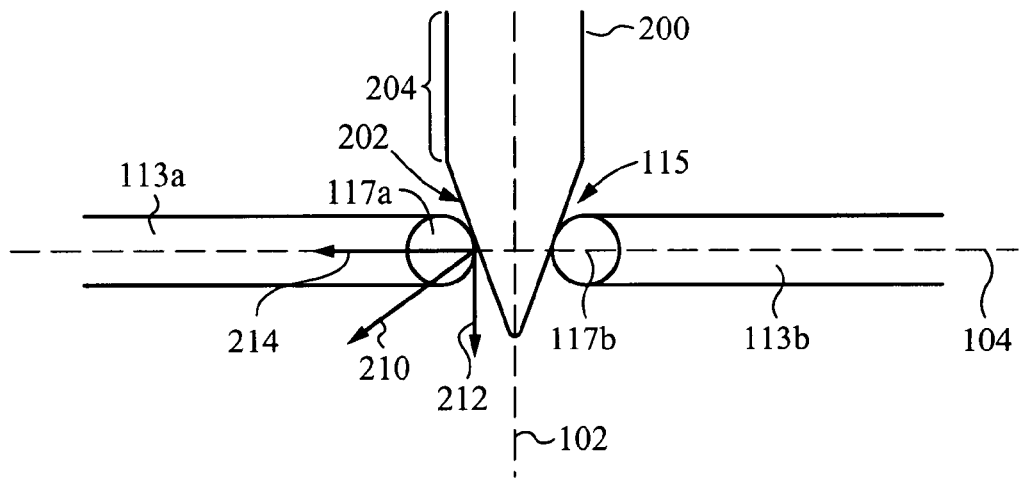
FIGS. 3 and 4 show a cross-section of a side view and a top view, respectively, of the haptic device shown in FIGS. 1 and 2 with an object disposed within the orifice of the haptic device.
Figure 4:
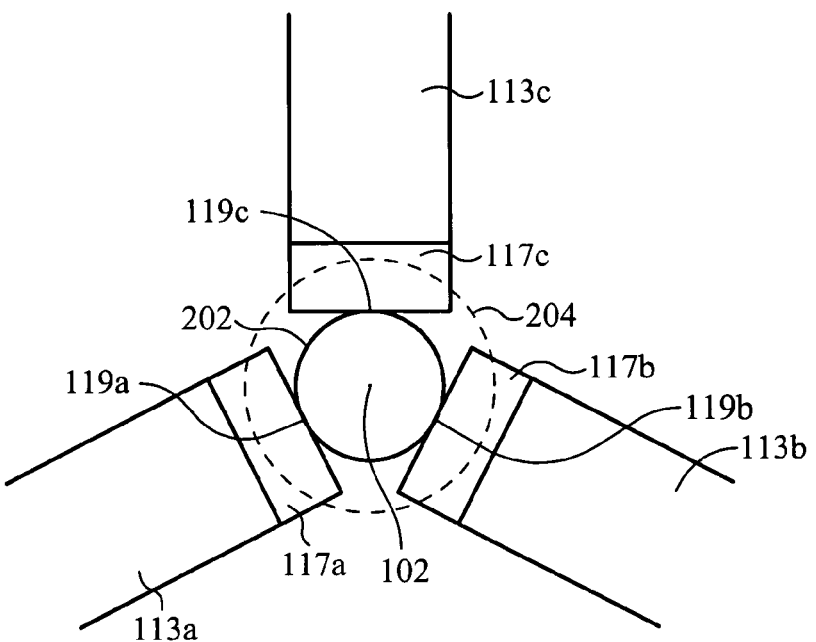

FIGS. 3 and 4 show a cross-section of a side view and a top view, respectively, of the haptic device shown in FIGS. 1 and 2 with an object disposed within the orifice of the haptic device. As shown in FIGS. 3 and 4, object 200 is disposed within orifice 115 of the interface portion 117. In the example shown in FIGS. 3 and 4, object 200 has a circular cross-section with a varied diameter: object portion 202 has a range of diameters and object portion 204 has a uniform diameter greater than the diameters of object portion 202.

Although object 200 is described as having a particular shape with a circular cross-section, various types and shapes of objects can be used with haptic device 100. For example, objects having non-circular cross-sections are possible. Such objects can have sizes that the increase and/or decrease along the longitudinal axis of the object. Objects having the same axis of symmetry throughout their lengths and objects having different axes of symmetry throughout their lengths are also possible. In addition to different shapes and cross-sections, such objects can be, for example, actual surgical instruments, replicas of surgical instruments or simulated surgical instruments. Simulated surgical instruments each can have, for example, one end for the user closely resembling the actual surgical instrument and the other end having a shape unrelated to the actual surgical instrument. This other end, for example, can be disposed within interface portion of the input device in such a way that it is unobservable to the user.

As shown in FIG. 4, when object 200 is disposed within orifice 115, object 200 contacts interface portion 117 within plane 104 and at locations 119a, 119b and 119c. Upon contacting interface portion 117, object 200 imparts a normal force 210 at locations 119a, 119b and 119c. As shown with respect to location 119a, force 210 can be resolved into two orthogonal components 211 and 212. Component 212 is aligned with longitudinal axis 102, and component 214 is aligned with a lateral axis, which can coincide with plane 104 when it is transverse to longitudinal axis 102. Thus, upon the application of force 210, component 212 engages location 119a with a surface friction that allows object 200 to move through orifice 115 and component 214 engages orifice 115 in a outwardly lateral direction.

Haptic device 100 can provide to object 200 a haptic feedback force inwardly with respect to longitudinal axis 102. More specifically, actuator 120 provides the haptic feedback force in a direction opposite of force component 214. Consequently, although force component 214 is applied thereby tending to increase the size of the orifice 115, the haptic feedback force applied by actuator 120 is applied to object 200 thereby tending resist the increase of the size of the orifice 115.

The particular manner in which actuator 120 applies haptic feedback force can affect the tactile feel of object 200 by a user. For example, where actuator 120 is an elastic member that applies a force corresponding to a spring constant, the haptic feedback force inwardly applied will be a function of the size of the orifice 115. Thus, the movement of object portion 202 within orifice 115 along longitudinal axis 102 results in a haptic feedback force being applied to resist the increasing diameter of object 200. The movement of object portion 204 within orifice 115 along longitudinal axis results in a constant applied force. By configuring interface portion 115 so that the surface friction is applied to force component 212, the resulting tactile feel is that of a haptic feedback force being applied as object portion 202 is being moved through orifice 115 and a minimal haptic feedback force being applied as object portion 204 is being moved through orifice 115. In other words, a user experiences tactile feedback when the object portion being moved within the orifice has an increasing or decreasing size and the user experiences a nominal tactile feedback when the object portion has uniform size. Said another way, when a change in the size of an object moved through the orifice is sufficient to adjust the size of the orifice, a haptic feedback force is produced thereby simulating the tactile feel of a biological orifice having its size changed by an inserted object.

Although object 200 was described above in reference to movement through orifice 115 along the longitudinal axis 102 of the orifice 115, haptic device 100 is configured such that an object can be moved through orifice 115 while being moved in a direction different from longitudinal axis 102 of the orifice 115. More specifically, because the object engages the interface portion 117 of the haptic device 100 at three or more locations, which define a plane, the object can be disposed within the orifice without being aligned with the longitudinal axis 102 of orifice 115. For example, FIG. 5 shows a cross-sectional cross view of the haptic device shown in FIGS. 1 through 4 where the object is disposed within the orifice in a direction different from the longitudinal axis of orifice.

Figure 5:
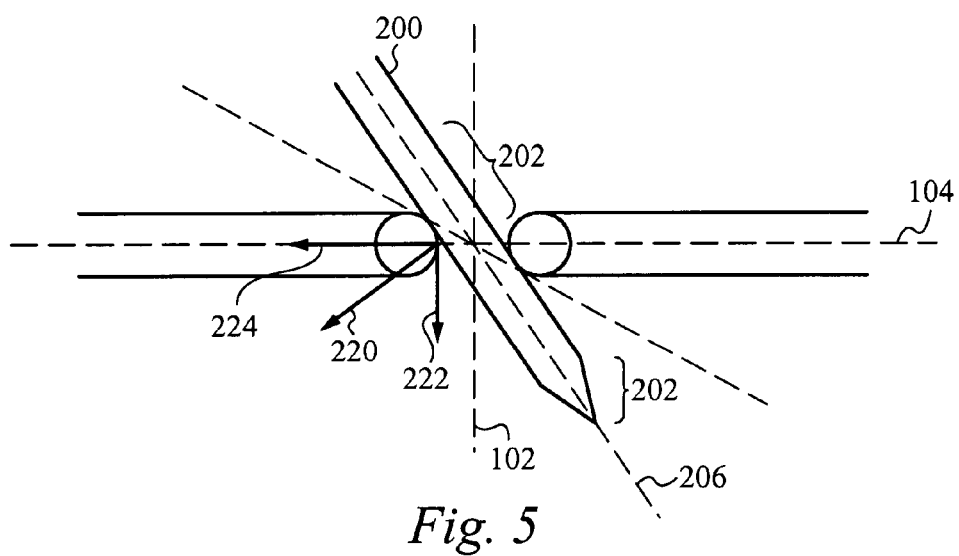
FIG. 5 shows a cross-sectional cross view of the haptic device shown in FIGS. 1 through 4 where the object is disposed within the orifice without being aligned with the longitudinal axis of orifice.

As shown in FIG. 5, object 200 has its own longitudinal axis 206 and contacts interface portion 117 at three locations that define plane 106. In this configuration, longitudinal axis 206 does not coincide with orifice longitudinal axis 102, and plane 106 does not coincide with transverse plane 104. In the example of FIG. 5, object portion 204 has a constant diameter while moving through orifice 115. Object 200 imparts a normal force 220, which can be resolved into two orthogonal components 222 and 224. Component 222 is aligned with orifice longitudinal axis 102, and component 224 is aligned with transverse plane 104. In this example, component 222 engages object 200 with a surface friction that allows object 200 to move through orifice 115, and component 224 engages object 200 in an outwardly lateral direction such that the size of orifice 115 is maintained.

Figure 6:
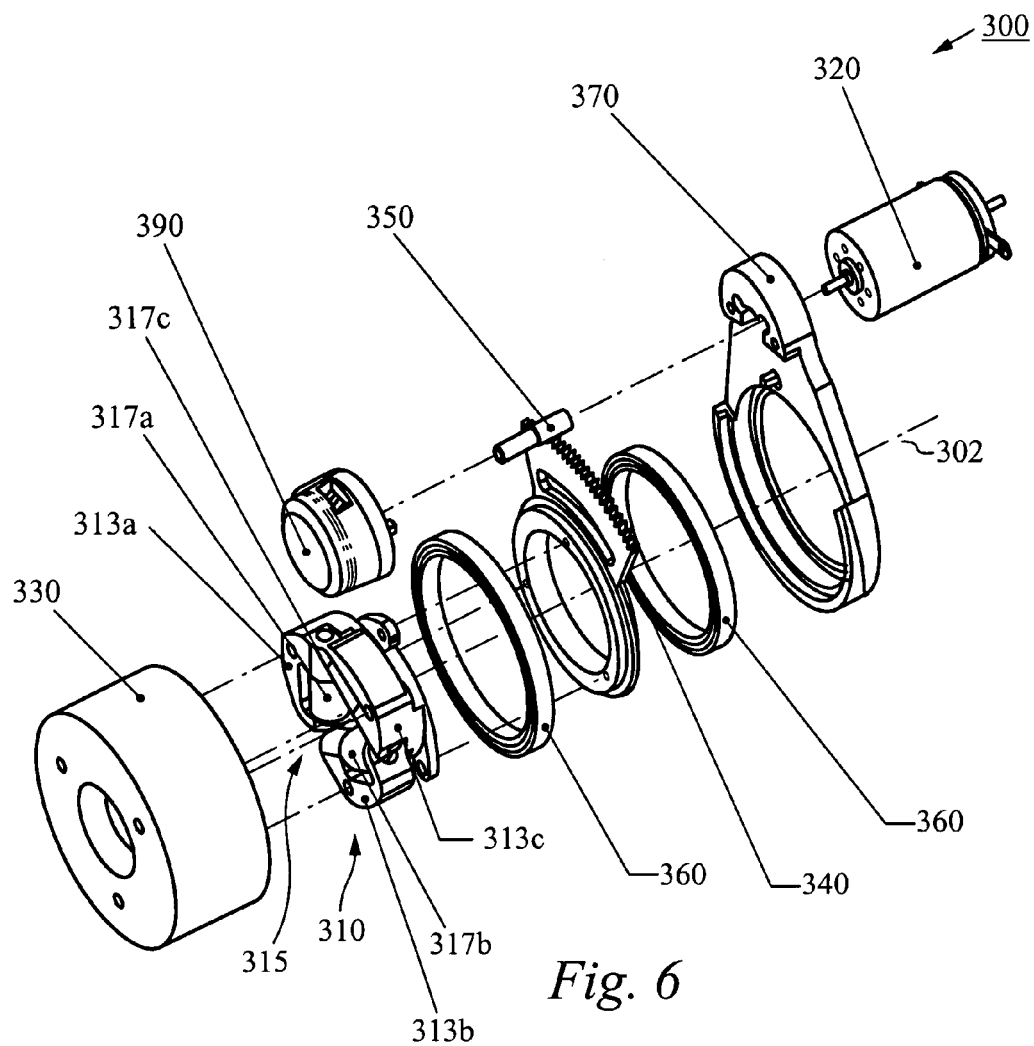
FIG. 6 shows an assembly view of a haptic device that simulates an orifice, according to another embodiment of the invention.

FIG. 6 shows an assembly view of a haptic device that simulates an orifice, according to another embodiment of the invention. As shown in FIG. 6, haptic device 300 includes input device 310 and actuator 320. Input device 310 includes crank arms 313a, 313b and 313c, and interface portion 317, which is defined by rollers 317a, 317b and 317c. Interface portion 317 defines orifice 315, which is selectively adjustable. Interface portion 317 also defines longitudinal axis 302 and plane 304.

Haptic device 300 also includes housing 330, crank gear 340, pinion 350, bearings 360, end cap 370 and sensor 380. Housing 330 supports pivot pins (not shown) on which crank arms 313a, 313b and 313c pivot. Housing 330 also generally covers or retains the remaining components of haptic device 300. Actuator 320 drives pinion 350, which in turn drives crank gear 340 and provides a squeeze amplification through a transmission ratio. Bearings 360 support crank gear 340 within housing 330. Crank gear 340 supports the drive pins (not shown) that actuate crank arms 313a, 313b and 313c in unison thereby selectively adjusting the size of the aperture 315 and providing the haptic feedback force, for example, in the radial direction. In other embodiments, the crank gear and pinion can be substituted with a friction drive pair, cable drive, tape drive or similar arrangement.

End cap 370 encloses the components of haptic device 300 while preloading bearings 360. End cap 370 also supports actuator 320 with respect to crank gear 340 (fixes the center distance) and provides crank gear 340 hard stops and supports the mounting of sensor 390. Sensor 390 detects the characteristics of interface portion 317 such as, for example, the orifice size. Sensor 390 allows closed loop control of interface portion 317 and the inward haptic feedback force applied by actuator 320. In addition, sensor 390 can be used in conjunction with a processor (not shown in FIG. 6) to provide complex control of the haptic feedback force applied to interface portion 317, as described in greater detail below in connection with FIGS. 17-19.

Figure 7:
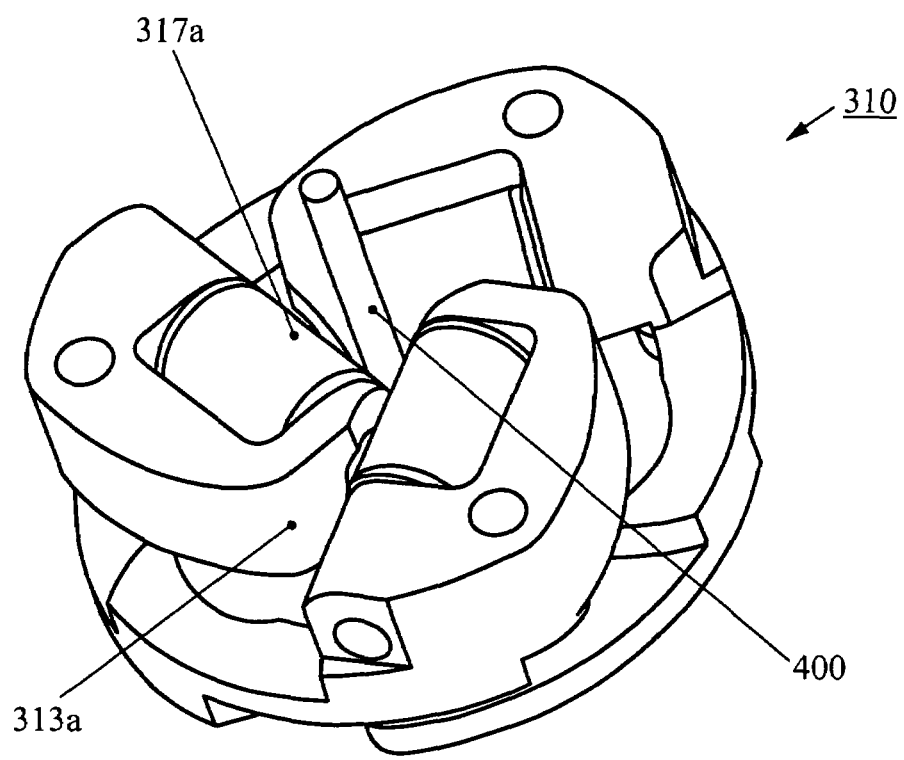
FIGS. 7 and 8 show a perspective view and a top view, respectively, of the interface portion of the haptic device shown in FIG. 6.
Figure 8:
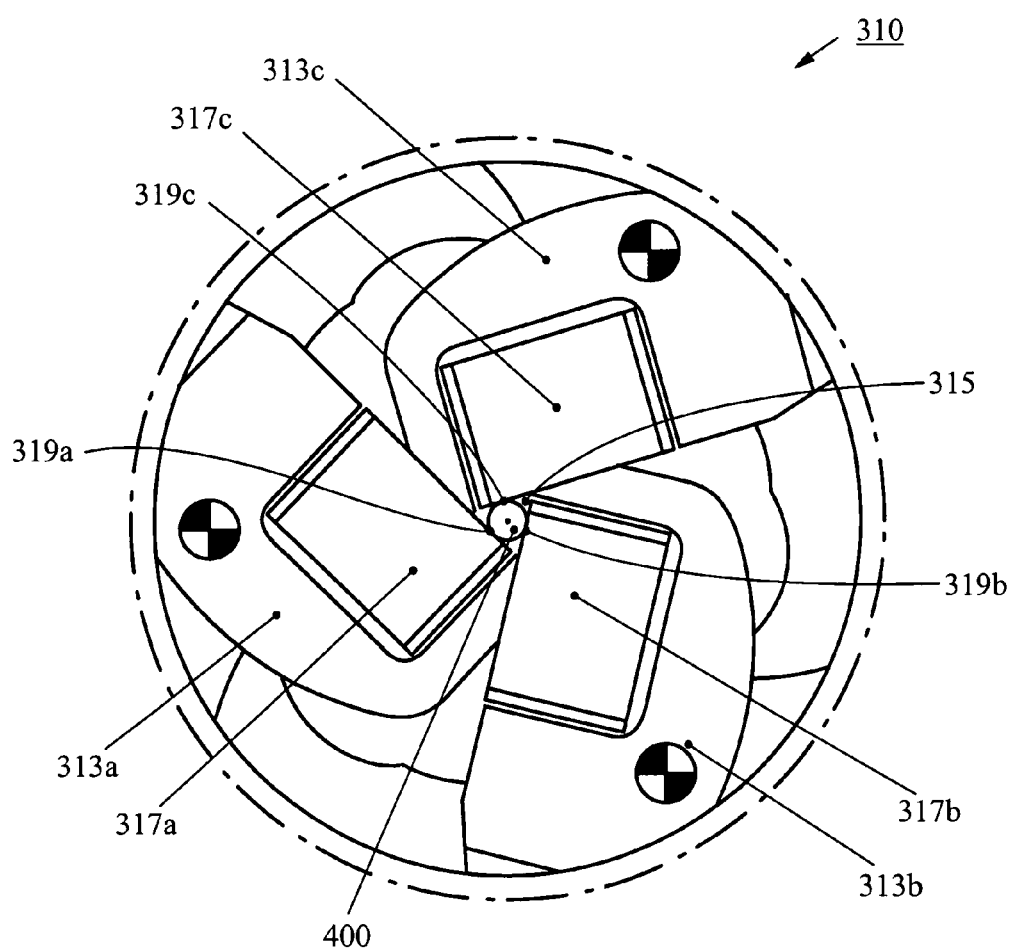

FIGS. 7 and 8 show a perspective view and a top view, respectively, of the interface portion of the haptic device shown in FIG. 6. As shown in FIGS. 7 and 8, while object 400 is disposed within orifice 315, three locations 319a, 319b and 319c of interface portion 310 contact object 400.

Figure 9:
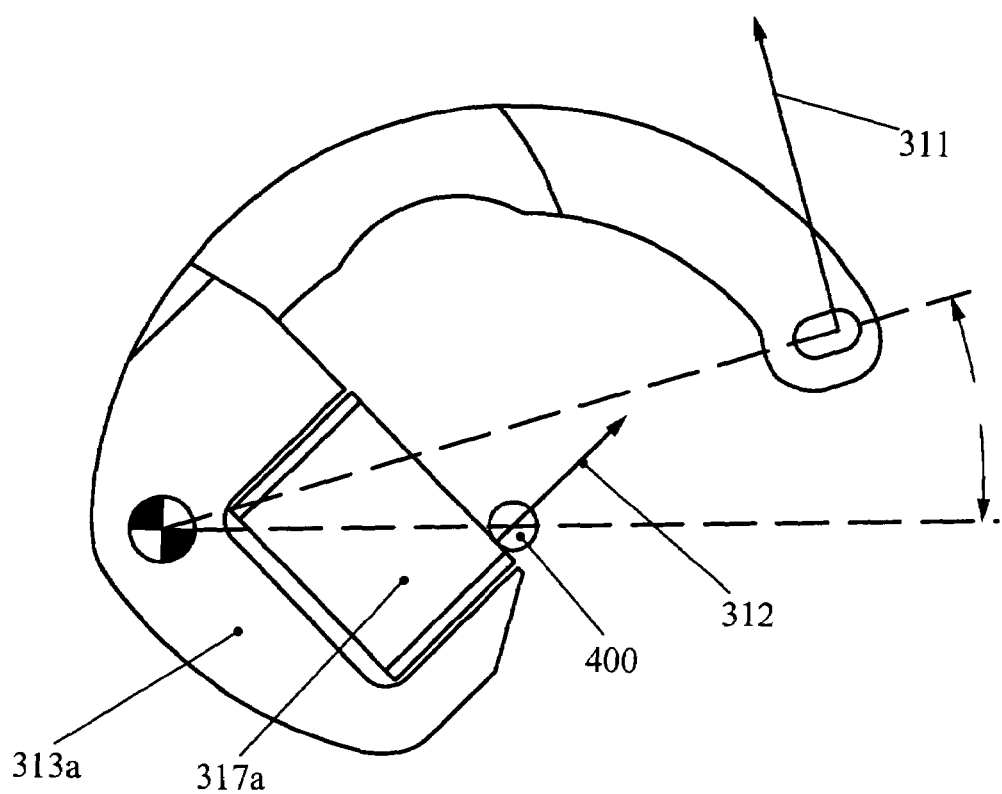
FIG. 9 shows a top view of a crank arm of the interface portion and the object shown in FIGS. 7 and 8.

FIG. 9 shows a top view of crank arm 313a of interface portion 317 and object 400 shown in FIGS. 7 and 8. The other two crank arms 313b and 313c are not shown in FIG. 9 to simplify the figure. As FIG. 9 shows, force component 311 shows the direction of the force imparted on crank arm 313a by the insertion of object 400. In other words, object 400 being disposed within orifice 315 results in object 400 imparting a force that is translated via crank arm 313a to force component 311. Accordingly, actuator 320 imparts a force to crank arm 313a that results in force 312 being imparted to object 400. Actuator 320 similarly imparts forces to crank arms 313*b* and 313*c* (not shown in FIG. 9) so that the haptic feedback force can be collectively imparted to object 400.

Figure 10:
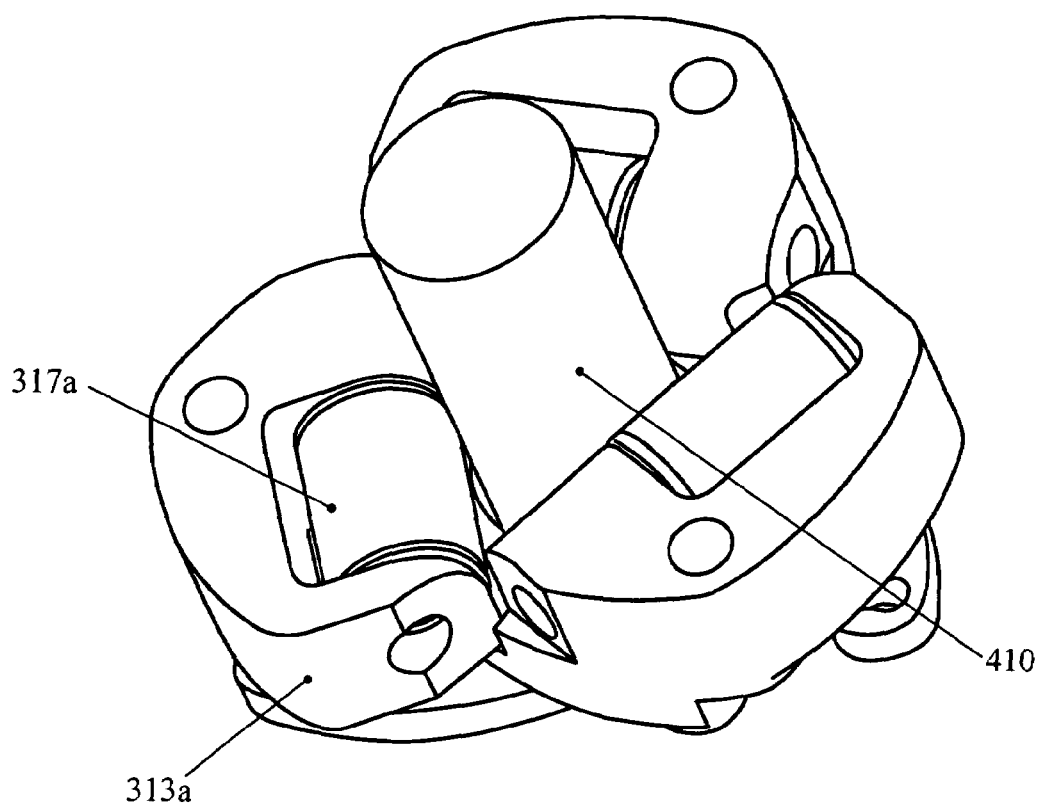
FIGS. 10 and 11 show a perspective view and a top view, respectively, of the interface portion of the haptic device shown in FIG. 6 with a larger object than that shown in FIG. 7.
Figure 11:
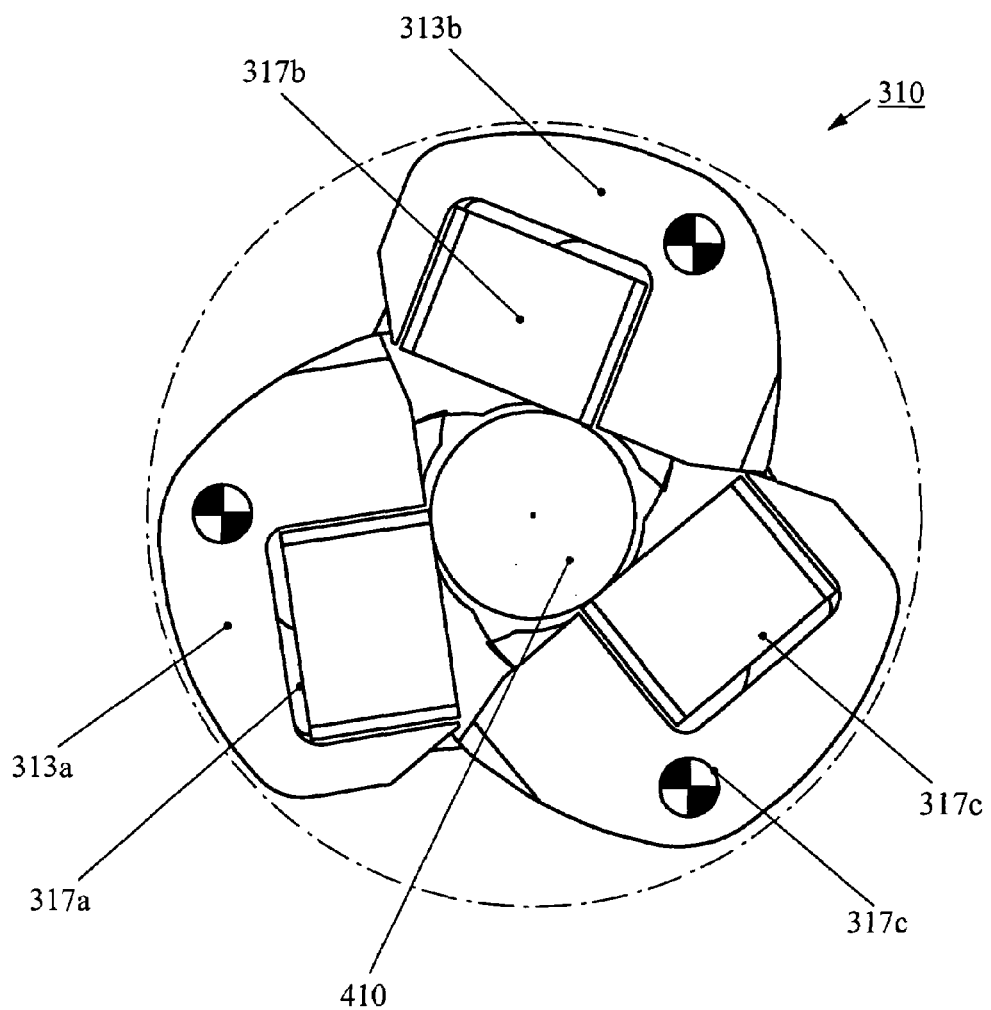

FIGS. 10 and 11 show a perspective view and a top view, respectively, of the interface portion of the haptic device shown in FIG. 6 with a larger object than that shown in FIG. 7. As shown in FIGS. 10 and 11, while object 410 is disposed within orifice 315, three locations 319*a*,319*b* and 319*c* of interface portion 310 contact object 410. For illustrative purposes, object 410 is larger than object 400 shown in FIGS. 7 through 9.

Figure 12:
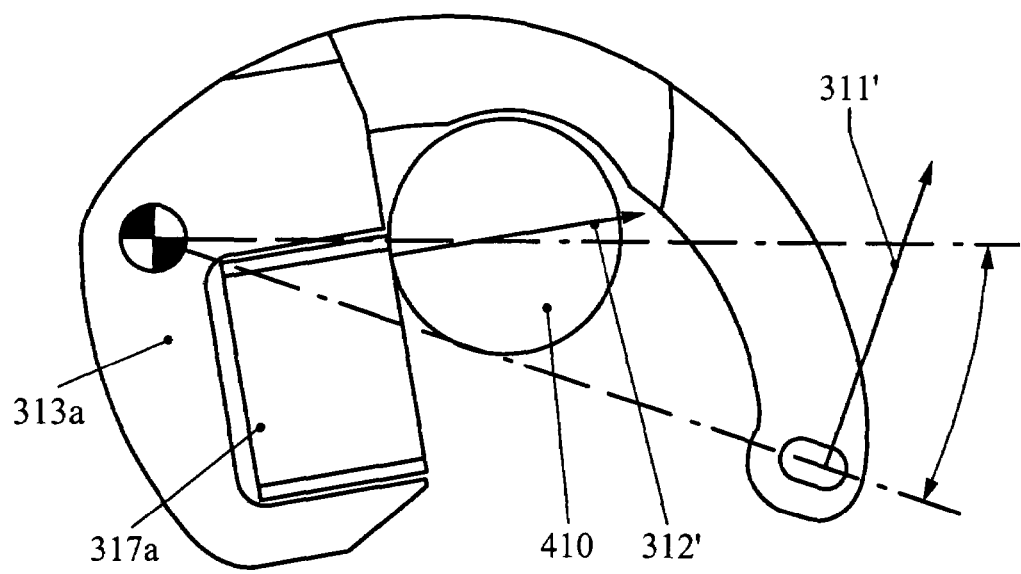
FIG. 12 shows a top view of a crank arm of the interface portion and the object shown in FIGS. 10 and 11.

FIG. 12 shows a top view of crank arm 313*a* of interface portion 317 and object 410 shown in FIGS. 10 and 11. The other two crank arms 313*b* and 313*c* are not shown in FIG. 12 to simplify the figure. As FIG. 12 shows, force component 311' shows the direction of the force imparted on crank arm 313*a* by the insertion of object 410. Accordingly, actuator 320 imparts a force to crank arm 313*a* that results in force 312' being imparted to object 410.

Several features of this embodiment are evident. First, haptic device 300 is self-centering: regardless of the size of the object (e.g., object 400 or object 410), the position of the object relative to orifice 315 is maintained within the center of orifice 315. Second, the volume of haptic device 300 is minimized regardless of the size of the object disposed within orifice 315.

Figure 13:
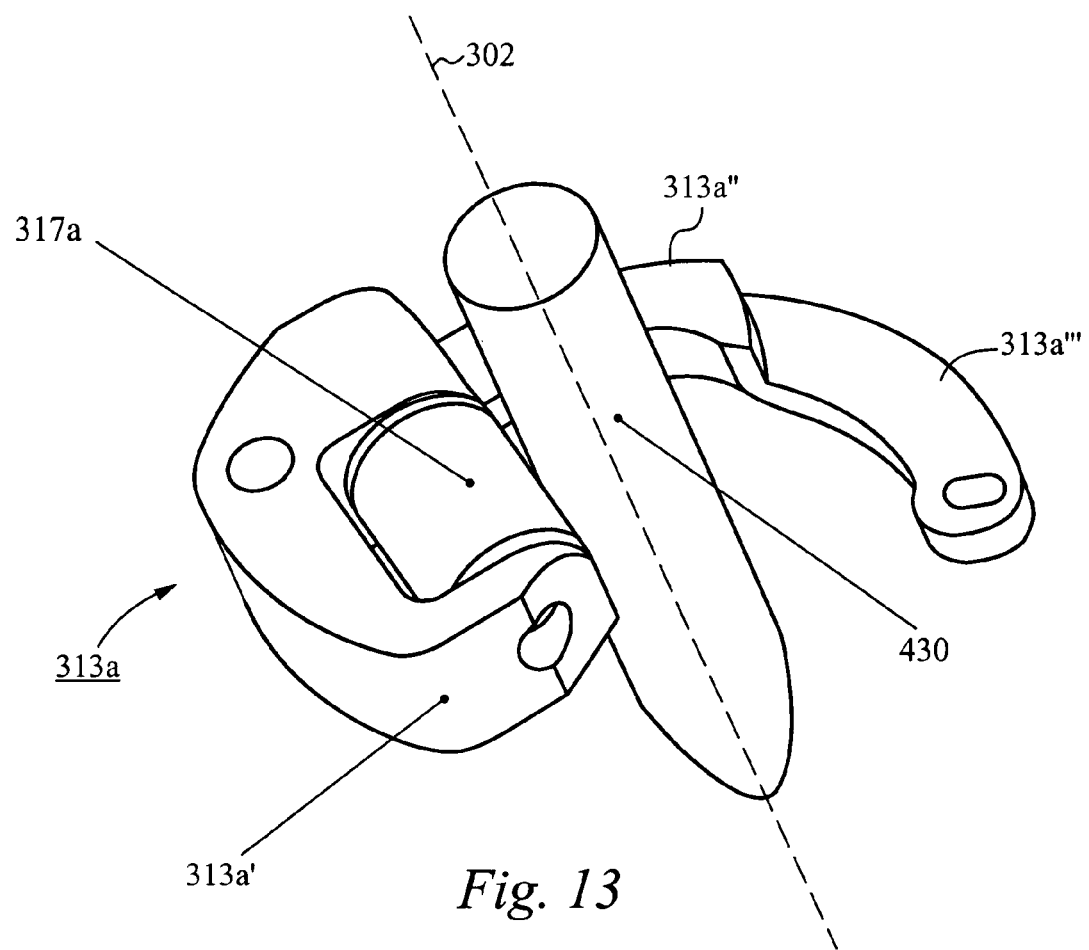
FIG. 13 shows a perspective view of one crank arm of the interface portion of the haptic device shown in FIG. 6.

This minimal volume is due to the nested and interlocking arrangement of crank arms 313*a*, 313*b* and 313*c*. For example, FIG. 13 shows a perspective view of one crank arm of the interface portion of the haptic device shown in FIG. 6. As shown in FIG. 13, crank arm 313*a* includes three portions, each of which are disposed within different planes. More specifically, crank arm 313*a* includes portions 313*a'*, 313*a"* and 313*a'''* each of which are disposed at different positions along longitudinal axis 302. Each of the portions 313*a'*, 313*a"* and 313*a'''* can nest and interlock with the similar portions of crank arms 313*b* and 313*c*. This allows the haptic device 300 is use a similar, minimal volume when relatively small objects (e.g., object 400) and relatively large objects (e.g., object 410) are disposed within orifice 315 of haptic device 300. For example, as the top views of FIGS. 8 and 11 show, the volume of haptic device 300 is maintained regardless of the size of objects 400 and 410.

Figure 14:
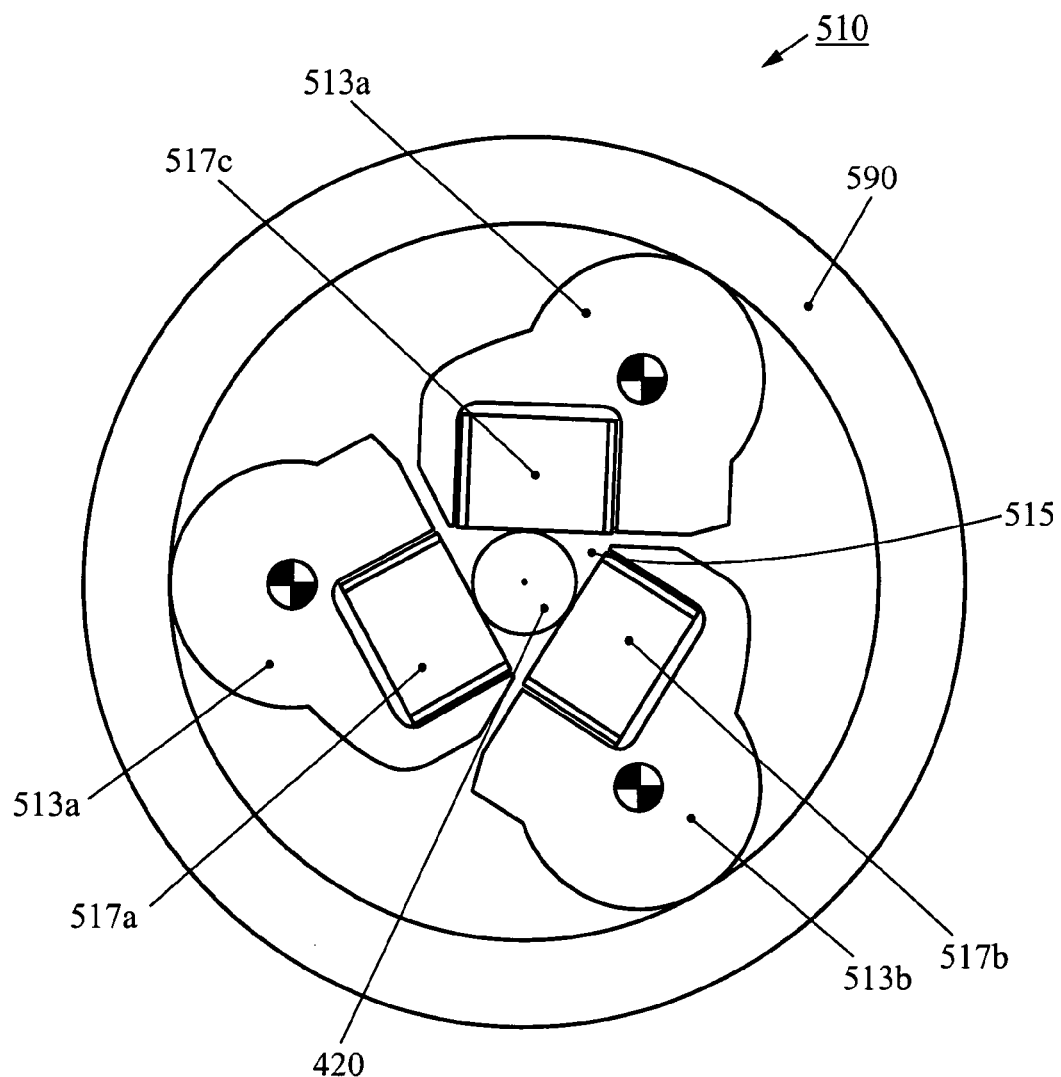
FIG. 14 shows a top view of a haptic device, according to another embodiment of the invention.

FIG. 14 shows a top view of a haptic device, according to another embodiment of the invention. As shown in FIG. 14, a haptic device includes input device 510. Input device 510 includes crank arms 513*a*, 513*b* and 513*c*, and interface portion 517, which is defined by rollers 517*a*, 517*b* and 517*c*. Interface portion 517 defines orifice 515, which is selectively adjustable. Input device 510 can be included with a haptic device by substituting it for the input device of the haptic device shown in FIG. 6.

Crank arms 513*a*, 513*b* and 513*c* can be configured as planetary crank arms that are actuated via sun member 590. More specifically, crank arms 513*a*, 513*b* and 513*c* are driven near pivot via gears, friction amplification, a cable or a tape drive (not shown). In this embodiment, because crank arms 513*a*, 513*b* and 513*c* are not nested or interlocking, input device 510 can be a flatter structure than input device 310 described above.

Figure 15:
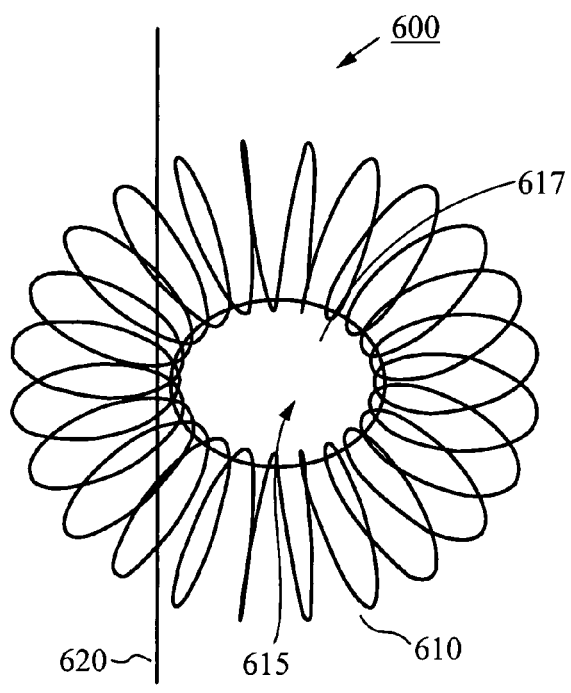
FIGS. 15 and 16 show top views of a haptic device for two different orifice sizes, according to another embodiment of the invention.
Figure 16:
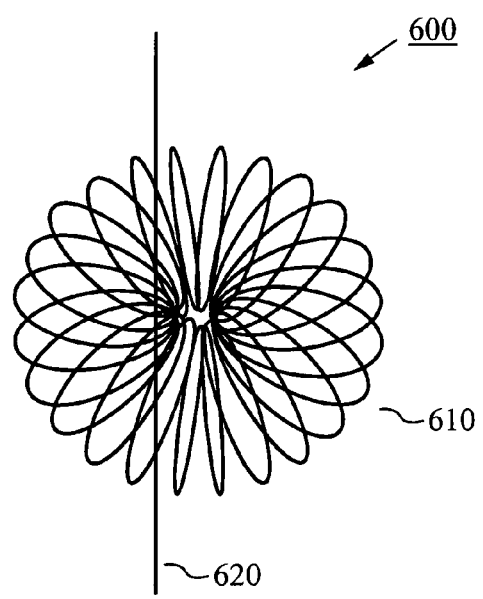

FIGS. 15 and 16 show top views of a haptic device for two different orifice sizes, according to another embodiment of the invention. As shown in FIGS. 15 and 16, haptic device 600 includes an input device 610 and an actuator 620. In this embodiment, the input device 610 is a helical spring defining a torus having an opening defined by interface portion 617. Interface portion 617 defines orifice 615. Actuator 620 includes a member such as a string, wire or cable, the tension of which can control the haptic feedback force applied to an object within orifice 615. More specifically, as the tension on actuator 620 is increased or decreased, the haptic feedback force applied to interface portion 617 is increased or decreased, respectively. This will affect the user's tactile feel of the object. FIG. 16 illustrates the situation where an object is not disposed within orifice 615: as the tension of actuator 620 is increased, the size of orifice 615 is decrease relative to the size of orifice shown in FIG. 15.

Input device 610 can be configured to be stationary or mobile within a housing (not shown). In other words, input device 610 can be fixedly mounted within a housing while providing a minimal amount of surface friction to an object passing through orifice 615. Alternatively, input device 610 can be moveably retained within a housing, thereby allowing input device 610 to roll within the housing while an object passes through orifice 615. This also can allow a minimal amount of surface friction to an object passing through orifice 615.

As discussed above, the actuator of a haptic device can be driven in such a way as to provide specific haptic feedback force. This, for example, allows the haptic device to simulate a particular characteristic or behavior of specific biological orifices. Generally speaking, this can be accomplished by determining the size of the orifice (e.g., via a sensor performing measurements of the interface portion), calculating a desired haptic feedback force and then driving the actuator accordingly. Although the following examples relate to the cervix in the context of simulating a hysteroscopy, the general principles can be applied to other biological orifices and related surgical procedures.

For a specific example, the actuator can drive the interface portion with a spring constant. In such an embodiment, the orifice to be simulated can have an initial closed size, e.g., initial closed radius, $r_0$. Thus, when the interface portion has a size, e.g., radius, r, less than $r_0$, then no haptic force is applied to the interface portion. When the interface portion has a size greater than $r_0$, then the applied haptic force, F, is described by the equation: $F=k\ (r-r_0)$.

Figure 17:
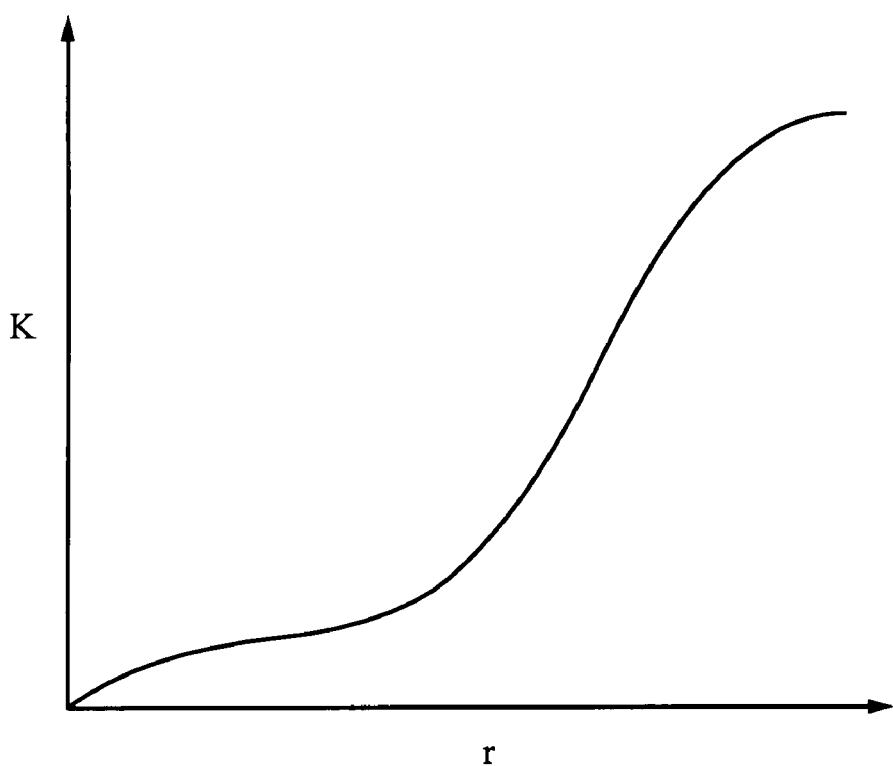
FIG. 17 shows an example of spring rate, k, as a function of r, where the orifice of a haptic device can operate based on the spring rate.

In an alternative embodiment, the spring rate can be varied as a function of the current size of the orifice of the interface portion. Such a spring rate can simulate, for example, different tissues involved with a biological orifice or damage to a biological orifice. In this embodiment, when the interface portion has a size less than $r_0$, no haptic force is applied to the interface portion. When the interface portion has a size greater than $r_0$, then the applied haptic force, F, is described by the equation: $F=k\ (r, t)\ (r-r_0)$, where the spring rate, k, is a function of r and/or time, t. FIG. 17 shows an example of spring rate, k, as a function of r. The spring rate, k, as a function of time, t, can have a similar or different shaped curve.

Figure 18:
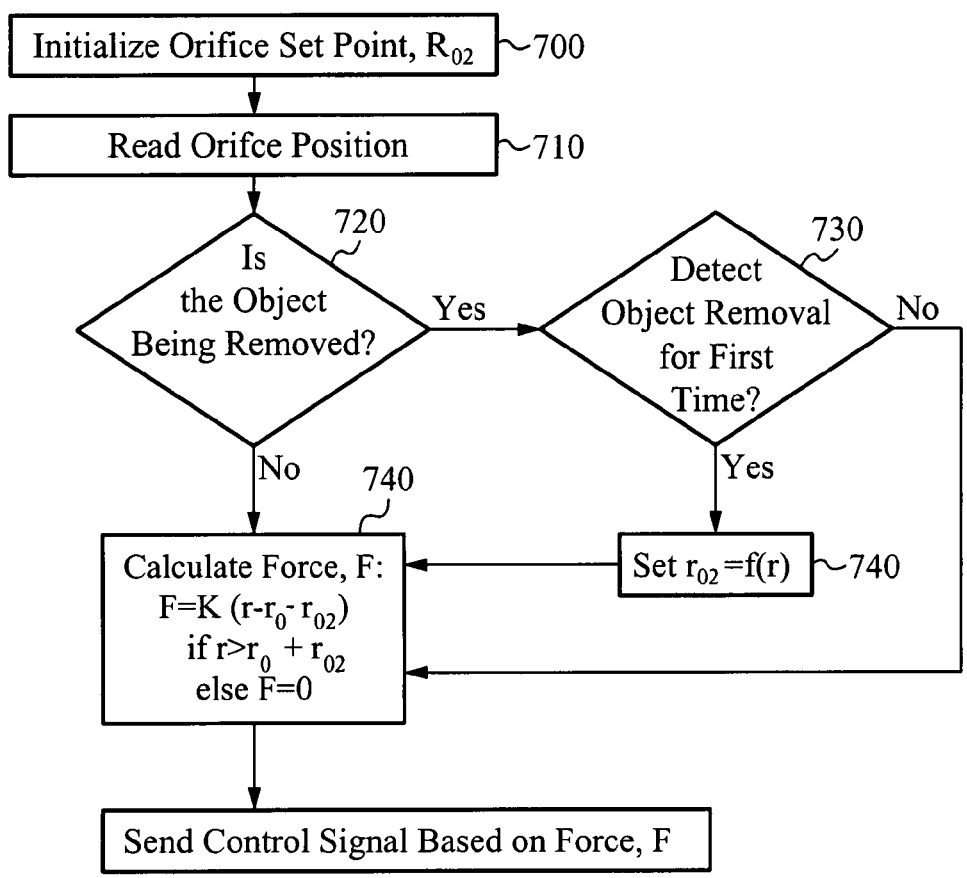
FIG. 18 shows a flow chart for controlling the orifice size of a haptic device, according to an embodiment of the invention.

In yet another embodiment, the spring set point can vary, for example, in response to a forced expansion of an object within the orifice or a simulated biological process such as a muscular response. In such an embodiment, the current nominal orifice size (also reference to as the set point) could lag the present size of the expanded orifice. This embodiment can simulate the situation where the orifice closes somewhat after the withdrawal on an object, but the size of the orifice remains larger than prior to insertion of the object. FIG. 18 shows a flow chart for controlling the orifice size of a haptic device, according to this embodiment.

The method shown in FIG. 18 can be performed, for example, by a processor coupled to an actuator of a haptic device. As shown in FIG. 18, at step 700, the orifice set point, $r_{02}$, is initialized to zero. At step 710, the size of the orifice of the haptic device is determined. A sensor coupled to the interface portion of a haptic device, for example, can measure the size of the orifice. At conditional step 720, a determination is made as to whether an object has been removed from the orifice of the haptic device. The sensor coupled to the interface portion of the haptic device can also make this determination. If the object is not being removed from the orifice, then the process proceeds to step 750. If the object is being removed from the orifice, then the process proceeds to conditional step 730.

At conditional step 730, a determination is made as to whether the object removal is being detected for the first time. If the object removal is not being detected for the first time, then the process proceeds to step 750. If the object removal is being detected for the first time, then the process proceeds to step 740. At step 740, the orifice set point, $r_{02}$, is set to a predetermined value (e.g., a value one half of the current size of the orifice).

At step 750, the haptic force, F, is calculated. If the interface portion has a size, r, less than $r_0+r_{02}$, then no haptic force is applied to the interface portion. If the interface portion has a size greater than $r_0$, then the haptic force, F, is described by the equation: $F=k(r-r_0-r_{02})$. At step 760, a control signal associated with the calculated haptic force, F, is sent to the actuator of the haptic device.

Although FIG. 18 is described in reference to spring constant and two set points, more complex behavior can be simulated. For example, two set points combined with a spring rate as a function of orifice size and time can be simulated. Such a simulation can be reflective of, for example, gynecology where the time behavior of a cervix is of interest. A biological cervix will close following dilation at a rate that is dependent, for example, on age, condition and number of previous births. The simulation of this behavior of the cervix can be helpful in the context of hysteroscopy or other interventions, for example, where a seal is created around a probing instrument for the purpose of maintaining distension by saline or other media. Such a simulation can reproduce the behavior of a cervix by simulating its closing at a preset rate such as for example a first order law.

Figure 19:
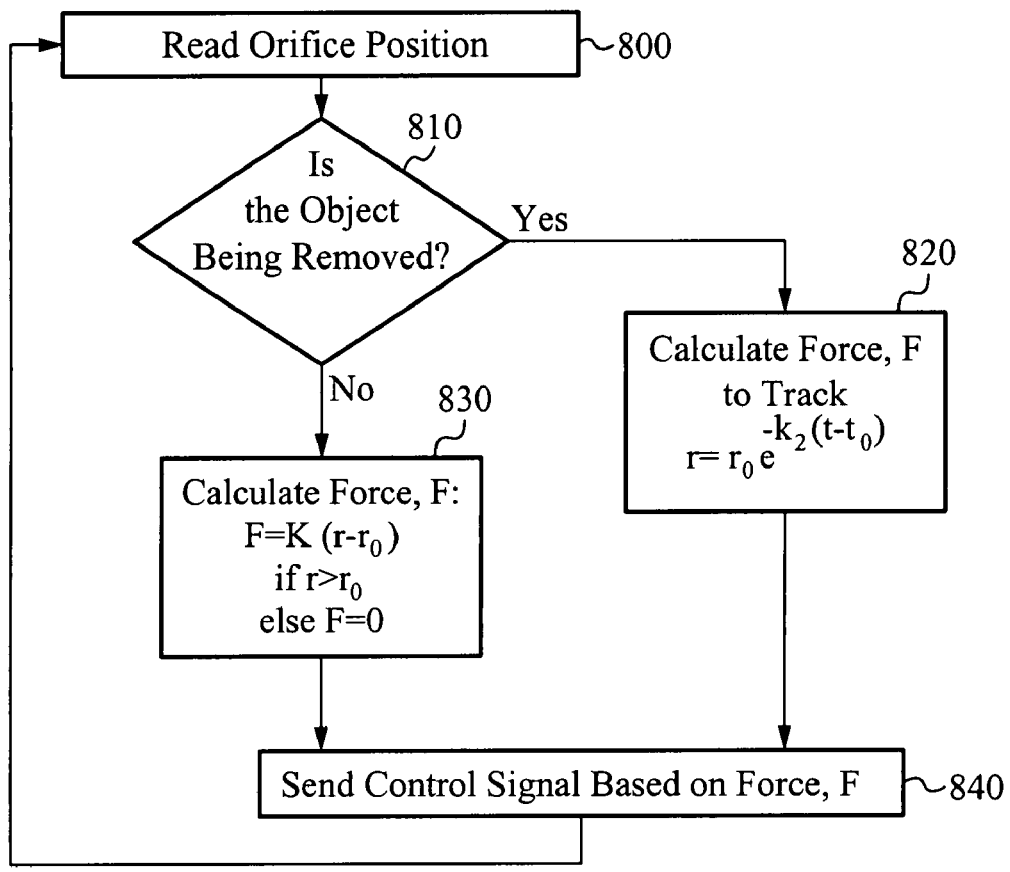
FIG. 19 shows a flow chart for controlling the orifice size of a haptic device, according to another embodiment of the invention.

FIG. 19 shows a flow chart for controlling the orifice size of a haptic device, according to this embodiment. As shown in FIG. 19, step 800, the size of the orifice of the haptic device is determined. A sensor coupled to the interface portion of a haptic device, for example, can measure the size of the orifice. At conditional step 810, a determination is made as to whether an object has been removed from the orifice of the haptic device. The sensor coupled to the interface portion of the haptic device can also make this determination. If the object is being removed from the orifice, then the process proceeds to step 820. If the object is not being removed from the orifice, then the process proceeds to conditional step 830.

At step 820, the haptic force, F, is calculated so that the interface portion has a decreasing size according to the following equation: $r=(r_1-r_0)\exp(-k_2(t-t_0))$, where $r_1$ is the orifice radius when the object removal is first detected, $k_2$ is the dilation constant and $t_0$ is the initial time when the object removal is detected. The dilation constant, $k_2$, can be predetermined as a function of age, condition and number of previous birth.

At step 830, the haptic force, F, is calculated such that if the interface portion has a size, r, less than $r_0$, then no haptic force is applied to the interface portion. If the interface portion has a size greater than $r_0$, then the haptic force, F, is described by the equation: $F=k(r-r_0-r_{02})$. At step 840, a control signal associated with the calculated haptic force, F, is sent to the actuator of the haptic device.

CONCLUSION

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents.

The previous description of the embodiments is provided to enable any person skilled in the art to make or use the invention. While the invention has been particularly shown and described with reference to embodiments thereof, it will be understood by those skilled in the art that various changes in form and details may be made therein without departing from the spirit and scope of the invention.

What is claimed is:

1. A method, comprising:
   receiving, at an interface portion defining an orifice, a force having a first component parallel to an axis and a second component perpendicular to the axis, the second component of the received force having a first direction, the orifice defining a plane, the axis being substantially perpendicular to the orifice plane wherein the received force is based on an object being disposed within the orifice of the interface portion, the object having a range of sizes corresponding to a range of longitudinal positions of the object disposed within the orifice of the interface portion; and
   applying, to the interface portion, a force having a component perpendicular to the axis in a second direction, substantially opposite from the first direction, in response to the received force, wherein the component of the applied force is a constant value independent of the longitudinal position of the object within the orifice of the interface portion.

2. The method of claim 1, wherein:
   the received force is based on an object being disposed within the orifice of the interface portion, the object having a range of sizes corresponding to a range of longitudinal positions of the object disposed within the orifice of the interface portion; and
   the component of the applied force is a first value in response to an increasing size of the object disposed within the orifice of the interface portion, the component of the applied force is a second value in response to a decreasing size of the object disposed within the orifice of the interface portion, the first value being different from the second value.

3. The method of claim 1, wherein:
   the received force is based on an object being disposed within the orifice of the interface portion, the object having a range of sizes corresponding to a range of longitudinal positions of the object disposed within the orifice of the interface portion; and
   the component of the applied force has a range of values based on the size of the orifice of the interface portion.

4. The method of claim 1, wherein:
   the received force is based on an object being disposed within the orifice of the interface portion, the object having a range of sizes corresponding to a range of longitudinal positions of the object disposed within the orifice of the interface portion; and the component of the applied force has a range of values based on at least one of a simulated patient age, a simulated patient cervix condition and a simulated patient prior number of births.

5. A processor-readable medium storing code representing instructions to cause a processor to perform a process, the code comprising code to:
receive, at an interface portion defining an orifice, a force having a first component parallel to an axis and a second component perpendicular to the axis, the second component of the received force having a first direction, the orifice defining a plane, the axis being substantially perpendicular to the orifice plane wherein the received force is based on an object being disposed within the orifice of the interface portion, the object having a range of sizes corresponding to a range of longitudinal positions of the object disposed within the orifice of the interface portion; and
apply, to the interface portion, a force having a component perpendicular to the axis in a second direction, substantially opposite from the first direction, in response to the received force, wherein the component of the applied force is a constant value independent of the longitudinal position of the object within the orifice of the interface portion.

6. A method, comprising:
receiving an object in an orifice defined by an interface portion of a device, the object having a first portion with its own longitudinal axis and a second portion with its own longitudinal axis different from the longitudinal axis of the first portion, wherein the receiving the object includes receiving the first portion and the second portion;
adjusting a size of the orifice, the orifice being selectively adjustable and having a range of sizes, the interface portion defining a plane and a longitudinal axis; and
applying haptic feedback inwardly with respect to the longitudinal axis within the plane to at least three locations of the interface portion when a change in a size of the object disposed within the interface portion is sufficient to adjust the size of the orifice.

7. The method of claim 6, wherein the size of the orifice is adjusted to a first size from the range of sizes when the first portion of the object is received within the orifice of the interface portion; and
the size of the orifice is adjusted to a second size from the range of sizes when the second portion of the object is disposed within the orifice of the interface portion, the first size is different from the second size.

8. The method of claim 6, the device including a plurality of members each having a first end and a second end, the first end of each member from the plurality of members being pivotable, the second end of each member from the plurality of members collectively defining the interface portion of the device, the plurality of members including a first member, wherein the applying the haptic feedback is via a second end of the first member.

9. The method of claim 6, the device including a first member, a second member and a third member, each of which is uniquely associated with a location from the at least three locations of the interface portion of the device, wherein the applying the haptic feedback is via the first member, the second member and the third member.

10. The method of claim 6, further comprising:
receiving a control signal, the applying the haptic feedback being based on the control signal.

11. A processor-readable medium storing code representing instructions to cause a processor to perform a process, the code comprising code to:
receive an object in an orifice defined by an interface portion of a device, the object having a first portion with its own longitudinal axis and a second portion with its own longitudinal axis different from the longitudinal axis of the first portion, wherein the receiving the object includes receiving the first portion and the second portion;
adjust a size of the orifice, the orifice being selectively adjustable and having a range of sizes, the interface portion defining a plane and a longitudinal axis; and
apply haptic feedback inwardly with respect to the longitudinal axis within the plane to at least three locations of the interface portion when a change in a size of the object disposed within the interface portion is sufficient to adjust the size of the orifice.

12. A method, comprising:
receiving a force at an interface portion defining a selectively adjustable orifice having a range of sizes, the force having a first component parallel to an axis and a second component perpendicular to the axis, the second component of the received force having a first direction, the orifice defining a plane, the axis being substantially perpendicular to the orifice plane; and
applying a force to the interface portion, the force having a component perpendicular to the axis in a second direction, substantially opposite from the first direction, in response to the received force.

13. The method of claim 12 wherein the received force is based on an object being disposed within the orifice of the interface portion, the object having a range of sizes corresponding to a range of longitudinal positions of the object disposed within the orifice of the interface portion and the component of the applied force is a constant value independent of the longitudinal position of the object within the orifice of the interface portion.

14. A processor-readable medium storing code representing instructions to cause a processor to perform a process, the code comprising code to:
receive a force at an interface portion defining a selectively adjustable orifice having a range of sizes, the force having a first component parallel to an axis and a second component perpendicular to the axis, the second component of the received force having a first direction, the orifice defining a plane, the axis being substantially perpendicular to the orifice plane; and
apply a force to the interface portion, the force having a component perpendicular to the axis in a second direction, substantially opposite from the first direction, in response to the received force.

15. The processor-readable medium of claim 14 wherein the received force is based on an object being disposed within the orifice of the interface portion, the object having a range of sizes corresponding to a range of longitudinal positions of the object disposed within the orifice of the interface portion and the component of the applied force is a constant value independent of the longitudinal position of the object within the orifice of the interface portion.

16. A method, comprising:
receiving an object in a selectively adjustable orifice having a range of sizes, the orifice defined by an interface portion of a device;
adjusting a size of the orifice, the orifice being selectively adjustable and having a range of sizes, the interface portion defining a plane and a longitudinal axis; and applying haptic feedback inwardly with respect to the longitudinal axis within the plane to at least three locations of the interface portion when a change in a size of the object disposed within the interface portion is sufficient to adjust the size of the orifice.

17. The method of claim 16 wherein the object having a first portion with its own longitudinal axis and a second portion with its own longitudinal axis different from the longitudinal axis of the first portion, wherein the receiving the object includes receiving the first portion and the second portion.

18. The method of claim 17, wherein the size of the orifice is adjusted to a first size from the range of sizes when the first portion of the object is received within the orifice of the interface portion; and the size of the orifice is adjusted to a second size from the range of sizes when the second portion of the object is disposed within the orifice of the interface portion, the first size is different from the second size.

* * * * *